United States Patent Office 3,188,572
Patented June 8, 1965

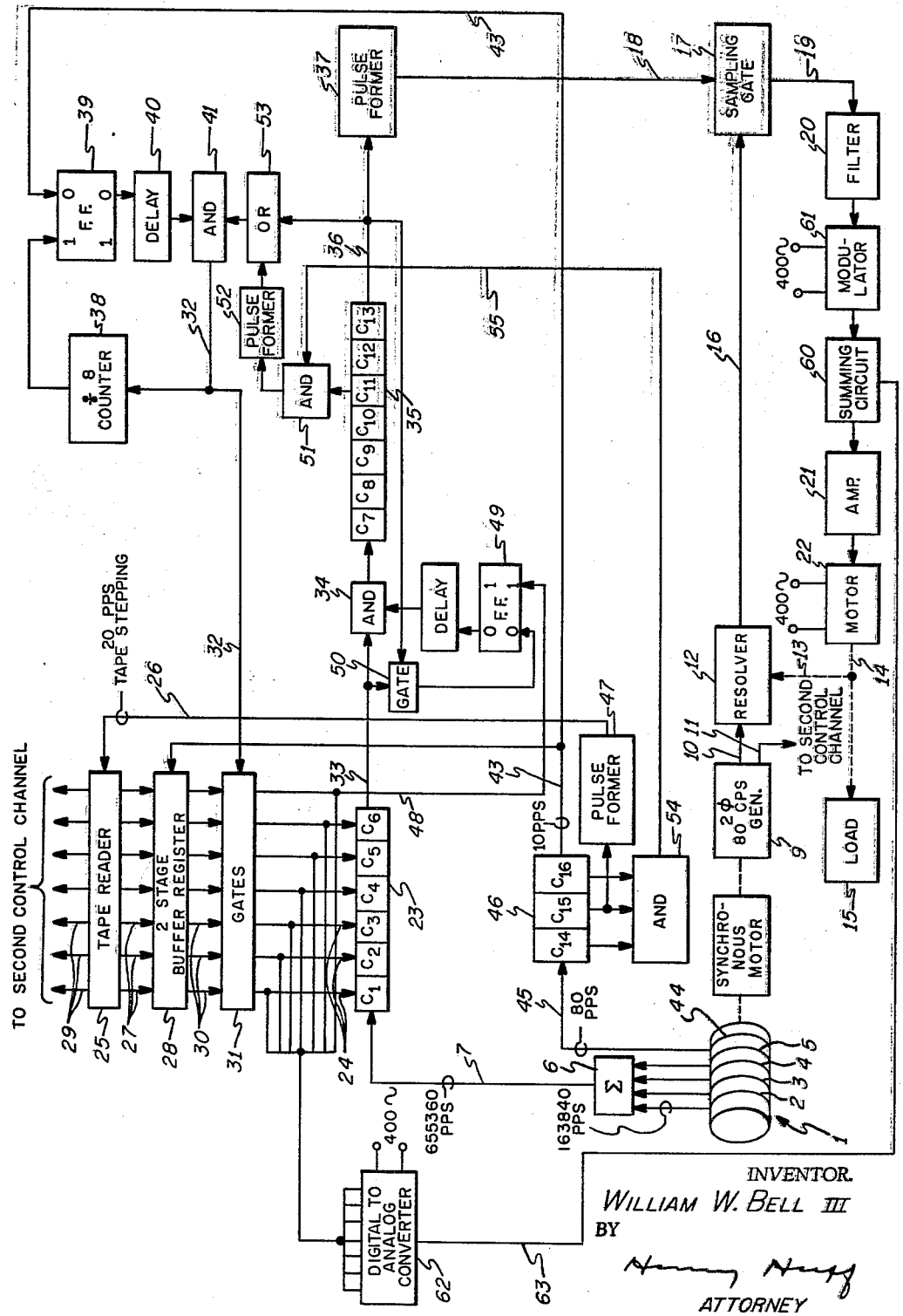

3,188,572
SERVO DISPLACEMENT AND SPEED CONTROL SYSTEM
William W. Bell III, Manhasset, N.Y., assignor to Sperry Rand Corporation, Great Neck, N.Y., a corporation of Delaware
Filed Mar. 26, 1962, Ser. No. 182,337
6 Claims. (Cl. 328—34)

The present invention generally relates to servo control apparatus and, more particularly, to a system adapted for automatically controlling the angular displacement and rotational speed of a servomechanism output shaft.

Displacement and speed control servomechanisms have been proposed for a wide variety of applications. Varying degrees of precision of displacement and speed control are required depending upon the particular usage. For example, automatic machine tool control applications for the fabrication of precision cams demand close control of tool displacement and tool feed rate so as to meet strict contour and surface finishing specifications.

Precise control applications generally call for digital rather than analog instrumentations. Accordingly, digitalized servomechanisms have been proposed for the automatic control of precision machine tools. The general practice is to control tool displacements independently of tool feed rates by means of separate command signals. Such practice tends to further complicate the already relatively complex digital machine control system. Complexity, in turn, is integrally associated with equipment cost and reliability considerations. It is always desirable, of course, to achieve the desired precision without undue complexity and thus without compromising cost and reliability.

It is the principal object of the present invention to provide simplified digital apparatus for controlling the displacement output of a servomechanism.

Another object is to provide digital apparatus for controlling the velocity output of a servomechanism.

A further object is to provide automatic digital apparatus for controlling the displacement and speed parameters of a servomechanism by means of the same control signal.

An additional object is to provide a digital servo displacement and speed control system for a machine tool.

Another object is to provide a simplified digital automatic control system for simultaneously controlling the tool displacements and the tool feed rates of a machine tool along two perpendicular axes of tool travel.

A further object is to provide means responsive to digital control signals derived from a single tape for simultaneously controlling the displacements and tool feed rates of a machine tool along two perpendicular axes.

These and other objects of the present invention, as will appear from a reading of the following specification, are achieved in a preferred embodiment by the provision of an automatic machine tool control system responsive to digital command data stored on a single tape. Each block of control data on the tape comprises two binary numbers. One of the numbers represents a desired displacement increment through which the tool is to be moved in a first direction. The second number represents a second displacement increment through which the tool is to be moved in a second direction perpendicular to said first direction.

A single tape reader is employed to read each of the numbers in succession as the tape is advanced at a predetermined rate. Binary signal representations of the numbers are then stored in respective registers, each register storing displacement increment data pertaining to a respective direction or axis along which the machine tool is to be controlled.

Each binary signal is applied to a respective pulse time position modulator which produces a fixed number of pulses whose time spacing is determined by the value of the digital number read from the tape. The time modulated output pulses, in turn, actuate a sampling gate which also receives a feedback sine wave signal having a phase representing the actual machine tool displacement.

The nominal spacing between the successive sampling pulses is precisely equal to the time separation between the successive crossover points of the feedback sine wave in the event that no machine tool displacement increment is desired. In order to produce tool displacement from present position, the spacing between the successive sampling pulses is varied from the nominal amount whereby the sampling pulses no longer coincide with the sine wave crossover points. An output (error signal is produced by the sampling gate having an amplitude proportional to the degree of non-coincidence and having a polarity dependent on the sense of said non-coincidence. The error signal is applied to a servo motor which simultaneously moves the machine tool to its new position and varies the phase of the feedback sine wave until the error signal from the sampling gate is reduced to zero. If desired, the error signal may be additively combined with another signal which is the analog of the displacement increment command. The combined signal, when applied to the servo motor, causes the machine tool to be driven more precisely in accordance with a desired velocity to a desired position.

An important feature of the invention is the manner in which the generation of servo command data is synchronized to the operation of the data tape reader. As previously mentioned, a fixed number of time modulated pulses is produced in response to each number read from the tape. The tape, however, is advanced at a constant rate so that the same length of time is available to generate the fixed number of time modulated pulses between each successive reading of the tape. The interval between successive advances of the tape is made substantially equal to the time required to generate the fixed number of command pulses having the nominal spacings established for the case where no displacement increment is required of the servo output shaft.

No synchronization problem arises when the interval between the successive command pulses is reduced in response to the tape data. On the other hand, insufficient time is alloted for generating the successive command pulses when the tape data calls for a servo displacement increment of an opposite sense. In the latter case, the invention provides for the automatic reduction of the time interval between the last occurring pulses of each set of command pulses so that the same fixed number of command pulses is produced for every successive advance of the tape.

For a more complete understanding of the present invention, reference should be had to the following specification and to the sole figure which is a simplified block diagram of a preferred embodiment.

Referring to the figure, the numeral 1 generally represents a magnetic drum source of system synchronizing pulses. Each of tracks 2, 3, 4 and 5 of drum 1 produce a total of 2,048 pulses for each revolution of the drum. When the drum is rotated at 80 revolutions per second, for example, each track produces 163,840 pulses per second. Moreover, each of tracks 2, 3, 4, and 5 is arranged to produce pulses phase displaced by 90 electrical degrees from the pulses of the adjacent track. The pulses read out of tracks 2, 3, 4 and 5 are combined in summing circuit 6 to produce a series of pulses on output line 7 having a repetition rate of 655,360 pulses per second.

Drum 1 is driven by a synchronous motor 8 which, in the illustrative case, rotates at a speed of 80 revolutions per second. Motor 8 also drives a two-phase generator 9 which produces on lines 10 and 11, respectively, a pair of output sine waves at the same frequency of 80 cycles per second but phase displaced relative to each other by 90 electrical degrees. Each of the output signals is applied as reference excitation to a resolver of a respective tool control axis. Only the apparatus required for controlling the machine tool along one of the axes is represented in the drawing. Substantially identical apparatus is required for the other control axis.

The 80 cycle per second sine wave appearing on line 10 is applied to resolver 12. The rotor of resolver 12 is driven by shaft 13 synchronously with the rotation of the tool drive 14 which controls the machine tool (generally represented by load 15) along one axis of movement. Resolver 12 produces on line 16 a sine wave nominally at a frequency of 80 cycles per second and having a phase determined by the position of shafts 13 and 14. The phase shifted sine wave on line 16 is applied to a sampling gate 17. Gate 17 is rendered conductive by sampling pulses applied via line 18 in a manner to be described later.

In the event that the sampling pulses of line 18 concur with the zero crossover points of the phase shifted sine wave of line 16, no output signal is produced by gate 17. On the other hand, where the sampling pulses occur at other than the crossover times, a series of pulses is produced on output line 19 having an amplitude proportional to the degree of non-coincidence and a polarity determined by the sense of the displacement of the sampling pulses from the zero crossover points of the phase shifted sine wave of line 16. The output pulses, if any, on line 19 are applied via pulse integrating filter 20 to modulator 61. Filter 20 may be a conventional "boxcar" detector. Neglecting, for the moment, the purpose of summing circuit 60, the modulated signal output from modulator 61 is coupled by circuit 60 and amplifier 21 to motor 22. In operation, motor 22 is driven in a direction and by an amount to cause the zero crossover points of the phase shifted sine wave of line 16 to coincide with the sampling pulses on line 18 at the input to sampling gate 17.

The pulses appearing on line 7 at the output of summing circuit 6 are applied to the input of a six stage binary counter 23. Counter 23 is adapted in a conventional manner to receive signals via parallel input lines 24 for advancing the value of the binary number stored in counter 23. The magnitude of the numerical advances are determined in accordance with digital data received by tape reader 25 from a command data source (not shown).

In the preferred embodiment, the data source is a perforated paper tape having successive blocks of binary command data. Each block of data consist of two rows of perforations. Each row provides for a seven place binary number. Each number, in turn, represents a desired displacement increment through which the machine tool is to be moved along a predetermined axis of tool travel. One of the two binary numbers of each block of data determines tool travel along a first axis; the other number of each block of data determines tool travel along a second axis perpendicular to said first axis. As the tape is advanced in response to the pulses of line 26, the command data numbers for the respective axes are read in alternation. That is, every other number read by reader 25 pertains to commands along the first axis whereas the intervening alternate numbers read by reader 25 pertain to commands along the second axis. The tape is advanced 20 times per second in synchronism with the reference signals of lines 7 and 10 by the pulses of line 26.

The series of pulse signals representing the first axis command data read by reader 25 is applied by parallel lines 27 to buffer register 28. Binary signal representations of the second axis command data are made available on parallel lines 29 for application to a second machine tool channel (not shown) which is substantially identical to the command channel shown in the figure. The seven bit binary signal representing the data stored in register 28 is applied via parallel lines 30 to first inputs of sampling gates 31. Gates 31 are actuated by trigger pulses appearing on line 32 to transfer the first 6 bits of the binary signal to respective stages of counter 23.

In operation, the value of the binary number stored in counter 23 is advanced by the value of one least significant bit in response to each pulse applied by line 7. On the other hand, the value of the binary number in counter 23 is advanced abruptly by a controllable amount in accordance with the value of the six bit binary signal appearing on parallel lines 24 each time that gates 31 are actuated. The value of the six bit binary signal, in turn, is determined by the binary number perforations on the tape which is read by reader 25. In the event that the value of the tape command number is zero, no signals are passed by gates 31 and counter 23 operates to divide the 655,360 pulses per second repetition rate of the pulses on line 7 by a factor of $2^6$ or 64 to produce a series of output pulses on line 33, having the nominal repetition rate of 10,240 pulses per second.

Assuming for the moment that the pulses of line 33 are directly applied to the input of conventional seven stage binary counter 35 and assuming further that the repetition rate of said pulses is 10,240 pulses per second, counter 35 produces a series of output pulses on line 36 at the repetition rate of 80 pulses per second. The output pulses of line 36 are shaped in pulse forming circuit 37 and then applied as trigger pulses to sampling gate 17 via line 18. The phase delays in the apparatus is adjusted so that the sampling triggers of line 18 coincide with the zero crossover points of the phase shifted sine wave of line 16 in the assumed case where the value of the binary number derived from the perforated tape is zero.

As previously mentioned, the same predetermined number of time-modulated sampling pulses (pulses of line 36) is produced in response to each binary number read from the perforated tape. In the case of the preferred embodiment, it has been found convenient to produce eight sampling pulses in response to each tape number representation. This is accomplished with the use of the logical decision circuits including pulse counter 38, flip-flop 39, pulse delay circuit 40 and AND circuit 41. Counter 38 divides the repetition rate of the pulses on line 32 by a factor of 8. Flip-flop 39 is placed into a condition for actuating AND circuit 41 by each pulse appearing on line 43. Flip-flop 39 is placed in its other state to block AND circuit 41 by the output pulses of counter 38.

The pulses on line 43 are derived from drum 1 in a manner now to be described. Track 44 of drum 1 produces one pulse for each drum revolution. Thus, when the drum is rotated at 80 revolutions per second, the pulses read out and appearing on line 45 recur at 80 pulses per second repetition rate. The pulses of line 45 are applied to the input of conventional three stage binary pulse counter 46 to produce with the aid of pulse former 47 a series of pulses having a repetition rate of 20 pulses per second on line 26 and a series of pulses having a repetition rate of 10 pulses per second on line 43.

Before proceeding with a description of the remaining structure of the figure, it is helpful to briefly consider the operation of the apparatus so far described. The tape is advanced at a 20 step per second rate. Inasmuch as the servo command data for the two perpendicular axes of tool travel are interleaved upon the tape, a given tool displacement command for one axis must be processed in $\frac{1}{10}$ of a second before the next command for that axis is read from the tape. The binary signals representing a given command are shifted out of buffer register 28 once each 10th of a second synchronously with one of the 10 cycle per second pulses at the output of counter 46. These pulses, which mark the start of each data processing interval, are also applied via line 43 to flip flop 39 to render AND circuit 41 conductive. The second tool axis (not shown) is synchronized to the same pulses.

Counters 23 and 35 may be considered as comprising a single 13 stage pulse counter, the first six stages of which are adapted to receive binary signals from buffer register 28 each time that gates 31 are actuated by a pulse on line 32 at the output of circuit 41. Assuming that no signals are passed by gates 31, cascaded counters 23 and 35 divide the pulse repetition rate (655,360 p.p.s.) of the pulses on line 7 by a factor of $2^{13}$ or 8,192 to produce a series of 80 cycles per second pulses on line 36 at the output of counter 35. The 80 cycles per second pulses on line 36 pass through conductive AND circuit 41 and line 32 to activate gates 31 eighty times per second. Inasmuch as the binary signal stored in register 28 changes only ten times per second, it will be seen that each number stored therein is transferred to counter 23 eight successive times before the number is changed.

It should be noted that the time spacing between the pulses produced on line 36 depends upon the value of the number transferred from buffer register 28 to counter 23. If the number transferred is larger than zero, the repetition rate of the pulses on line 7 will be divided by a factor smaller than $2^{13}$ thereby decreasing the time separation between the successive pulses of line 36. After eight successive pulses appear on line 36 during the data processing interval marked by a given pulse at the output of counter 46, counter 38 resets flip flop 39 to close AND circuit 41. A decrease in the spacing between the successive pulses on line 36 causes sampling gate 17 to be actuated in advance of the zero crossover points of the sine wave of line 16. The resulting error signal drives motor 22 in a direction so as to advance the phase of the sine wave at that rate which causes the zero crossover points to concur with the sampling pulses of line 18.

In order to drive resolver 12 and output shaft 14 in a direction opposite to that just described, it is necessary to increase the time separation between the successive pulses produced on line 36. Such time-modulation of the pulses of line 36 results from what might be termed a "negative" displacement increment command. As before, the magnitude of the displacement is determined by the value of the six bit binary number transferred from buffer register 28 via gates 31 to counter 23. The sense of the displacement is determined by the value of the seventh bit which is transferred by gates 31 to line 48. When the seventh bit is a "one," flip flop 49 is set to a condition which blocks AND gate 34. Flip flop 49 is reset to open AND gate 34 by the first pulse appearing on line 33 and passing through normally conducting gate 50. Gate 50 is momentarily blocked each time that a pulse appears on line 36.

If the sign of the displacement command is positive (the value of the seventh or sign bit being zero), AND gate 34 always conducts. If the sign of the displacement command is negative (the value of the seventh digit is unity), and gate 34 blocks each first pulse appearing on line 33 but passes all of the subsequent pulses during each interval marked by successive pulses on line 36. The effect is to lengthen the interval between the successive pulses on line 36 by an amount proportional to the two's complement of the six bit number transferred from buffer register 28 to counter 23 by gates 31. Thus, a negative displacement command lengthens the time separation between the pulses on line 36 whereby sampling gate 17 is actuated at times subsequent to the occurrences of the zero crossovers of the phase shifted sine wave produced on line 16. An error signal of appropriate polarity is generated by gate 17 to drive motor 22 in the proper direction so as to restore coincidence between the sampling pulses and the zero crossover points.

It will be observed that the lengthening of the repetition interval of the pulses on line 36 from the nominal interval of $\frac{1}{80}$ of a second (in the case of negative displacement commands) causes the total interval of eight successive pulses on line 36 to exceed $\frac{1}{10}$ of a second. Thus, the occurrence of eight successive pulses on line 36 is not always a reliable basis for actuating gates 31 the required eight times before the number stored in buffer register 28 is changed to a new command value. Accordingly, AND circuit 51, pulse former 52 and OR circuit 53 are provided to make certain that gates 31 always are properly actuated during a given data processing interval. AND circuit 51 is conditioned for conduction each time that it receives a gating pedestal from the output of AND circuit 54 via line 55. Circuit 54, in turn, is connected to each of the three stages of counter 46 and produces an interval measuring or gating pulse pedestal on line 55 having a leading edge occurring $\frac{1}{80}$ of a second prior to the production of each 10 cycles per second pulse on line 43. That is, AND circuit 54 becomes conductive each time that the count in counter 46 is one less than the value required to produce an output pulse on line 43.

The gating pulse pedestal on line 55 actuates circuit 51 and permits the next occurring output pulse of stage $C_{11}$ of counter 35 to pass through OR gate 53 and AND circuit 41 in lieu of the eighth pulse of line 36. This action occurs whenever a negative displacement is being executed at which times said eighth pulse occurs too late to activate gates 31 before a new number is inserted in buffer register 28. In this manner, gates 31 are always activated exactly eight successive times either by eight successive pulses on line 36 (for positive displacements) or by a combination of the pulses of line 36 and the output pulses of stage $C_{11}$ of counter 35 (for negative displacements). Irrespective of whether a positive or a negative displacement command is being executed by the machine tool control system, however, it is always the pulses appearing on line 36 which activate sampling gate 17.

In summary, each displacement increment represented by the punched tape data is converted into a fixed number of time-modulated pulses on line 36. The time spacing between each of the time-modulated pulses in each group is determined by the value of a respective displacement increment command. The pulses on line 36 sample the phase shifted sine-wave on line 16 to generate an error signal at the output of gate 17 of proper magnitude and sense to control the displacement and the time rate of change of displacement of the output shaft of servo motor 22. Servo motor 22 drives the machine tool along a predetermined one of its two coordinate axes of tool travel. The machine tool is simultaneously controlled along the other of its coordinate axes by a separate data processing channel substantially the same as the one represented in the drawing.

The displacement commands are determined independently for each channel. For this reason, the single tape is stepped at a predetermined rate synchronously with the rotation of drum 1 rather than at a rate dependent upon the value of the command data for either channel. Thus, it is necessary that each channel complete the processing of its respective data in a fixed interval of time, determined by the rotation of drum 1. Alternatively, separate tapes and tape handling equipment could have been provided for the independent control of each data channel. An important feature of the invention lies in the elimination of a second tape and second tape handling equipment by using a single tape and single tape handling equipment for deriving the command data for both of the data processing channels.

The value of the number represented by the binary signals on lines 30 at the output of buffer register 28 determines the incremental displacement of the shaft 14 of driving motor 22. Inasmuch as the signals on lines 30 are applied to counter 23 at times and at rates which are determined by the successive actuations of gates 31, it can be seen that the displacement as well as the velocity of shaft 14 are controlled. There will be, however, a finite displacement tracking error due to the fact that a finite error signal is required at the output of sampling gate 17 to drive motor 22 unless special provision is made. Such tracking error may be eliminated by introducing a velocity control term in the servo error signal path. This can be accomplished in accordance with the present invention by the simple addition of summing circuit 60 and digital to analog converter 62.

Each of the digital signals at the outputs of gates 31 is applied to conventional converter 62 which also receives the same illustrative 400 cycle excitation as is applied to motor 22 and modulator 61. Converter 62 produces in a conventional manner a 400 cycle signal on line 63 having an amplitude representing the analog value of the binary signal on lines 24 and a phase determined by the sign digit present on line 48. The 400 cycle analog voltage is applied to summing circuit 60 wherein it is additively combined with the 400 cycle error signal output of modulator 61 and then applied via amplifier 21 to motor 22. The signal introduced by line 63 and circuit 60 drives motor 22 at the rate commanded by the digital signals appearing on lines 30. The servo loop acts to bring the crossovers of the feedback sine wave of line 16 into coincidence with the sampling pulses of line 18 whereby both the displacement and the velocity of shaft 14 are controlled precisely.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. Generating means for producing a fixed number of output pulses time spaced from each other in accordance with the value of a number represented by a digital signal, said generating means comprising:

a source for producing timing pulses and interval measuring pulses, the frequency of said timing pulses being higher than the frequency of said measuring pulses, a source for producing said digital signal, a pulse counter comprising a first group and a second group of counting stages connected in cascade, the first stage of said first group being connected to receive said timing pulses and each stage of said first group being connected to receive a respective bit of said digital signal, each of said timing pulses changing the value of the count in said first group by the same predetermined amount, said digital signal changing the value of the count in said first group by an amount determined by the value of the number represented by said digital signal, first actuable means responsive to a control signal for applying said digital signal to said first group, second actuable means connected to pass a signal from one of the stages of said second group when said second actuable means is actuated, said interval measuring pulses being applied to and actuating said second actuable means, means for summing the output of said second actuable means and the output of the last stage of said second group to produce said control signal, said last stage of said second group producing said output pulses, third actuable means for selectively connecting the output of said summing means to said first actuable means when said third actuable means is actuated, and means for counting the outputs from said third actuable means to produce an output signal when a fixed number of said outputs have occurred, said output signal deactuating said third actuable means.

2. Generating means for producing a fixed number of output pulses time spaced from each other in accordance with the value of a number represented by a digital signal, said generating means comprising:

a source for producing timing pulses and interval measuring pulses, the frequency of said timing pulses being higher and harmonically related to the frequency of said measuring pulses, a source for producing said digital signal, a pulse counter comprising a first group and a second group of counting stages connected in cascade, the first stage of said first group being connected to receive said timing pulses and each stage of said first group being connected to receive a respective bit of said digital signal, the last of said second group producing said output pulses, each of said timing pulses advancing the value of the count in said first group by the same predetermined amount, said digital signal advancing the value of the count in said first group by an amount determined by the value of the number represented by said digital signal, actuable means for applying said digital signal to said first group, a first gating circuit connected to pass a signal from one of the stages of said second group when said first gating circuit is actuated, said interval measuring pulses being applied to and actuating said first gating circuit, means for summing the output of said first gating circuit and the output of said last stage of said second group, a second gating circuit for selectively connecting the output of said summing means to said actuable means when said second gating circuit is actuated, and means for counting the outputs from said second gating circuit for producing a control signal when a fixed number of outputs have occurred, said control signal deactuating said second gating circuit.

3. Generating means for producing a fixed number of output pulses time spaced from each other in accordance with the algebraic value of a number represented by a digital signal, said generating means comprising:

a source for producing timing pulses and interval measuring pulses, the frequency of said timing pulses being higher than the frequency of said measuring pulses, a source for producing said digital signal, a pulse counter comprising a first group and a second group of counting stages, the last stage of said first group being selectively connected to the first stage of said second group in accordance with the sign of the number represented by said digital signal, the first stage of said first group being connected to receive said timing pulses and each stage of said first group being connected to receive said digital signal, each of said timing pulses changing the value of the count in said first group by the same predetermined amount, said digital signal changing the value of the count in said first group by an amount determined by the magnitude of the number represented by said digital signal, first actuable means responsive to a control signal for applying said digital signal to said first group, second actuable means connected to pass a signal from one of the stages of said second group when said second actuable means is actuated, said interval measuring pulses being applied to and actuating said second actuable means, means for summing the output of said second actuable means and the output of the last stage of said second group to produce said control signal, said last stage of said second group producing said output pulses, third actuable means for selectively connecting the output of said summing means to said first actuable means when said third actuable means is actuated, and means for counting the outputs from said third actuable means to produce an output signal when a fixed number of said outputs have occurred, said output signal deactuating said third actuable means.

4. In a servo system wherein the servo error signal is produced by comparing the phase of a servo feedback signal with the occurrences of a series of command pulses, said command pulses being time spaced from each other in accordance with the value of a number represented by a digital signal, means for generating said command pulses comprising:

a source for producing timing pulses and interval measuring pulses, the frequency of said timing pulses being higher than the frequency of said measuring pulses, a source for producing said digital signal, a pulse counter comprising a first group and a second group of counting stages connected in cascade, the first stage of said first group being connected to receive said timing pulses and each stage of said first group being connected to receive said digital signal, each of said timing pulses changing the value of the count in said first group by the same predetermined amount, said digital signal changing the value of the count in said first group by an amount determined by the value of the number represented by said digital signal, a first gating circuit responsive to a control signal for applying said digital signal to said first group, a second gating circuit connected to pass a signal from one of the stages of said second group when said second gating circuit is actuated, said interval measuring pulses being applied to and actuating said second gating circuit, means for summing the output of said second gating circuit and the output of the last stage of said second group to produce said control signal, said last stage of said second group producing said command pulses, a third gating circuit for selectively applying the output of said summing means to said first gating circuit when said third gating circuit is actuated, and means for counting the outputs from said third gating circuit to produce an output signal when a fixed number of said outputs have occurred, said output signal deactuating said third gating circuit.

5. In a servo system wherein the servo error signal is produced by comparing the phase of a servo feedback signal with the occurrences of a series of command pulses, said command pulses being time spaced from each other in accordance with the algebraic value of a number represented by a digital signal, means for generating said pulses comprising:

a source for producing timing pulses and interval measuring pulses, the frequency of said timing pulses being higher than the frequency of said measuring pulses, a source for producing said digital signal, a pulse counter comprising a first group and a second group of counting stages, the last stage of said first group being selectively connected to the first stage of said second group in accordance with the sign of the number represented by said digital signal, the first stage of said first group being connected to receive said timing pulses and each stage of said first group being connected to receive said digital signal, each of said timing pulses changing the value of the count in said first group by the same predetermined amount, said digital signal changing the value of the count in said first group by an amount determined by the magnitude of the number represented by said digital signal, a first gating circuit responsive to a control signal for applying said digital signal to said first group, a second gating circuit connected to pass a signal from one of the stages of said second group when said second gating circuit is actuated, said interval measuring pulses being applied to and actuating said second gating circuit, means for summing the output of said second gating circuit and the output of the last stage of said second group to produce said control signal, said last stage of said second group producing said output pulses, a third gating circuit for selectively applying the output of said summing means to said first gating circuit when said third gating circuit is actuated, and means for counting the outputs from said third gating circuit to produce an output signal when a fixed number of said outputs have occurred, said output signal deactuating said third gating circuit.

6. A servo system wherein an error signal is produced by comparing the phase of a feedback signal with the occurrences of a series of command pulses and wherein said error signal is combined with a second signal to control the phase and the frequency of said feedback signal, said system comprising:

a source for producing timing pulses synchronously related to said feedback signal, a source for producing a digital signal, a pulse counter comprising a first group and a second group of counting stages connected in cascade, the first stage of said first group being connected to receive said timing pulses and each stage of said first group being connected to receive said digital signal, the last stage of said second group producing said command pulses, each of said timing pulses changing the value of the count in said first group by the same predetermined amount, said digital signal changing the value of the count in said first group by an amount determined by the value of the number represented by said digital signal, first actuable means responsive to a control signal for applying said digital signal to said first group, second actuable means for applying the output of the last stage of said second group to said first actuable means when said second actuable means is actuated, means for counting the outputs from said second actuable means to produce an output signal when a fixed number of said outputs have occurred, said output signal deactuating said second actuable means, means coupled to receive said digital signal for producing said second signal having a characteristic related to said value of said number represented by said digital signal, and means for combining said second signal and said error signal.

References Cited by the Examiner

UNITED STATES PATENTS

| | | | |
|---|---|---|---|
| 2,945,183 | 7/60 | Hartke et al. | 328—48 |
| 2,994,790 | 8/60 | Delaney | 328—42 X |
| 3,002,151 | 9/61 | Broderick | 328—42 X |
| 3,015,806 | 1/62 | Wang et al. | 328—34 X |
| 3,044,065 | 7/62 | Barney | 328—42 X |

ARTHUR GAUSS, *Primary Examiner.*

MALCOLM A. MORRISON, *Examiner.*